May 2, 1939. H. B. BECK 2,156,329
OIL FILTER AND CARTRIDGE
Filed March 5, 1937
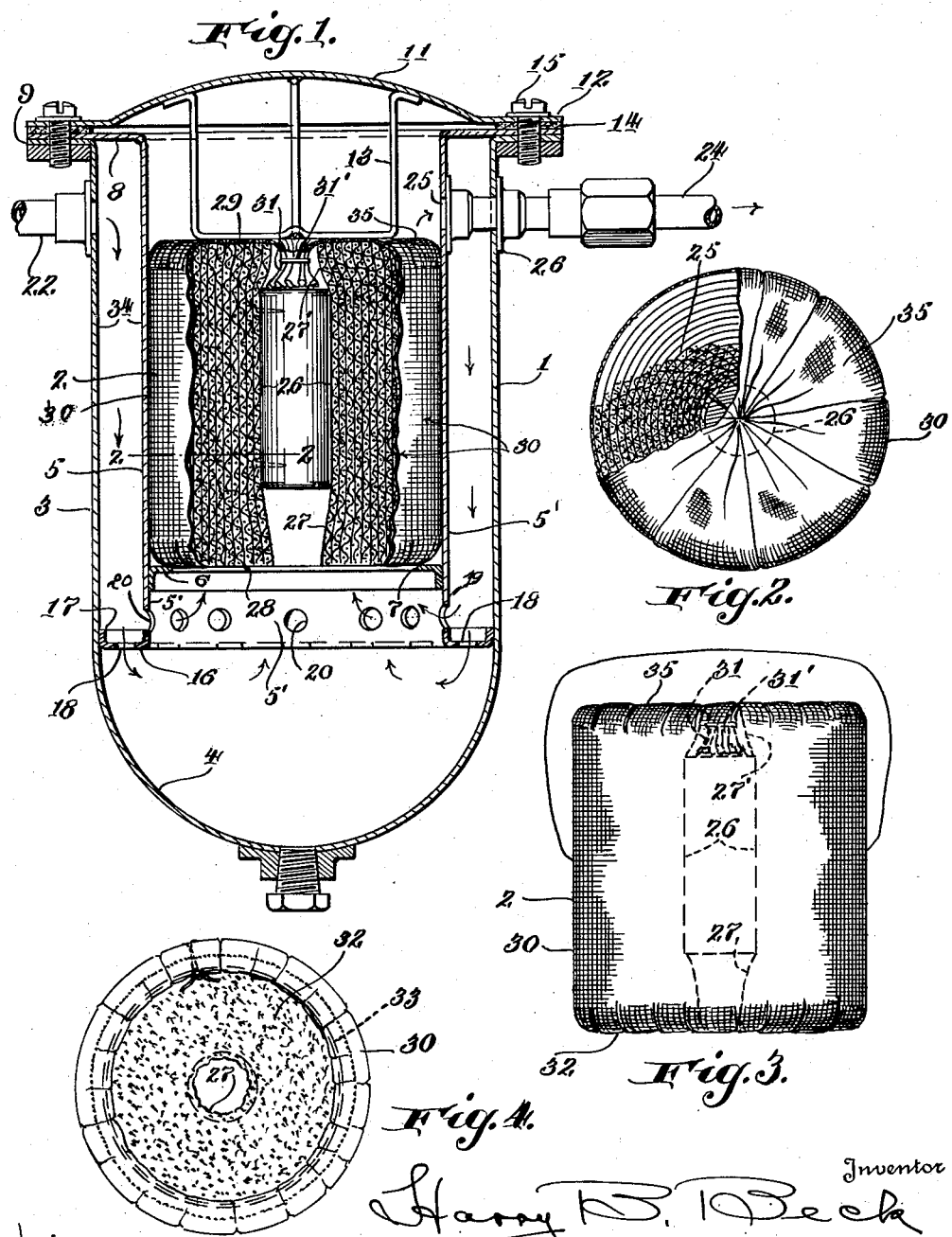
Inventor
Harry B. Beck
By Edwin F. Samuels
Attorney Patented May 2, 1939

2,156,329

UNITED STATES PATENT OFFICE 2,156,329

OIL FILTER AND CARTRIDGE

Harry B. Beck, Baltimore, Md., assignor to William E. Hooper & Sons Company, Baltimore, Md., a corporation of Maryland Application March 5, 1937, Serial No. 129,186

8 Claims. (Cl. 210—112)

The invention relates to the filtration of oil and particularly to the filtration of limited quantities of oil in continuous circulation and subject to continuous contamination as in the operation of an internal combustion motor, the device of the invention being particularly adapted to this purpose and also to filtering fuel for an oil burner.

In the use of such apparatus the filtering medium has been provided in the form of a roll or bundle of fiber or fabric which when exhausted for purposes of filtration on account of the accumulation of solid particles and sludge, is removed and replaced by a new filtration unit or member. These replaceable units are referred to in the art as cartridges, the complete filtering apparatus of this type comprising a filter casing and cartridge.

An important object of the invention is the provision of a filter cartridge of increased capacity in proportion to the size of the cartridge and the quantity of filtering material employed therein, thus giving an increased capacity of the apparatus as a whole. This improved filter cartridge is also capable of production at a moderate cost not in excess of the cost of the filter cartridges of the earlier type which are of similar size and less capacity so that the invention provides without increased expense a filter cartridge having an increased length of life, an increased total filtration capacity and increased efficiency as compared to previous apparatus of this general type.

A difficulty in the use of prior art filters is due to the tendency of the oil, in the filter casing on the inflow side of the cartridge or filtering member where the foreign matter separated from the oil accumulates, to flow backward into the crank case when the motor is stopped, thus carrying this accumulation or part of it back into the lubricating system.

The invention further provides a filter casing so constructed and arranged as to prevent back flow of the oil and consequent return of the separated material as carbon, metal dust, grit, etc., from the filter to the crank case or other part of the lubricating system proper when the motor is stopped. Similar conditions are at times encountered in operation of oil burners.

In the accompanying drawing I have illustrated a filter casing and cartridge embodying the features of the invention in the preferred form.

In the drawing:

Figure 1 is a vertical central section on a plane of the axis of the casing, the filter cartridge being shown fragmentarily in elevation and being broken away near the axis to show the central portion of the cartridge in section on the same plane, the core being shown in elevation.

Figure 2 is a top plan view of the cartridge, the same being broken away to show the same fragmentarily in section on the line 2—2 in Figure 1.

Figure 3 is a side elevation of the cartridge, the core or plug and the chambers at the ends of the same being shown in broken lines.

Figure 4 is a bottom plan view of the cartridge or roll.

Referring to the drawing by numerals each of which is used to indicate the same or similar parts in the different figures, the construction shown comprises a filter casing 1 and cartridge 2 which in the preferred form is installed therein in a manner to be described, the cartridge which is an important feature of the invention being capable of general application to this general type of filter.

The casing 1 as shown comprises a shell or outer casing 3 which is preferably of cylindrical form having a settling basin 4 at the bottom which is shown as hemispherical and of the diameter of the outer casing or shell 3 though it may be of any suitable or convenient contour. Within the outer casing 3 I have shown an inner cylindrical casing or cartridge holder 5 having an inwardly projecting peripheral flange 6 near the bottom to support the cartridge 2 providing a relatively large free opening 7, for the entrance into contact with the filtering material comprising the cartridge, of the oil being filtered. The inner casing or cartridge holder 5 as shown extends upwardly to a point near the top of the outer casing 3 being formed at the top with a peripheral outwardly projecting flange 8 which is welded, soldered or otherwise secured to the peripheral top flange 9 of the outer casing 3, the inner casing being open at the top at 10 for the insertion of the cartridge.

The outer casing is closed at the top by means of a cover 11 which is separable from the outer casing to admit or remove the cartridge the cover having a flat peripheral edge portion 12 which rests on a gasket 14 overlying the outer peripheral portion of the flange 8 to which the cover is secured in any suitable manner as by means of screws or bolts 15. The cover 11 as shown is provided with a depending wire frame 55

13 or other suitable means for pressing the cartridge 2 downwardly against the support 6.

The cylindrical wall of the inner casing or cartridge holder 5 as shown extends below the support 6 and is further supported and secured at the bottom by a peripheral wall or ring 16 which may be a flange formed on the lower end of the said wall 5' of the holder 5 and soldered or welded as to its outer periphery at 17 to the outer casing 3. This ring or flange 16 is perforated at 18 at numerous points along its entire length for the passage of the oil. The lower edge 19 of the cylindrical wall 5' of the inner casing 5 is also perforated at 20, these details being subject to wide variation.

In accordance with the invention as to the casing the inlet passage or tube 22 is near the top, entering the outer casing only and the outlet passage or tube 24 is preferably also near the top, leading from the inner casing at 25 above the filter cartridge 2, the outlet tube 24 being sealed to the outer casing around its outer circumference at 26 by welding, soldering or the like to prevent leakage.

With the arrangement shown with the oil inlet 22 and preferably the outlet 24 near the top, the settling basin 4 being at the bottom, the sediment is retained in the settling basin by gravity and does not tend to return to the oil circulation when the motor stops this being an important difficulty encountered in the operation of the oil filters now in use with internal combustion motors, and also a difficulty to be encountered in filtering the fuel fed to oil burners.

An important novel feature of the invention resides in the filter cartridge 2 which is in the form of a cylindrical roll of relatively open mesh cotton or similar fiber preferably of plain weave and relatively heavy soft yarn so that all portions of the yarn are exposed to the flow of the oil and have the maximum effect in filtration.

In the form of cartridge shown a fabric indicated by reference character 30 is wrapped closely about a central core or plug 26 which is most conveniently and cheaply formed of wood and solid though it may be of other material otherwise shaped and this core 26 is in accordance with the invention as to the cartridge of considerably less length than the axial length of the cartridge, providing axially located chambers 27 and 27' one at each end of the cartridge in line with the core and open toward the ends 28 and 29 of the cartridge whereby the end surfaces of the filter are considerably increased as to the area available for the entrance and exit of oil giving the filter cartridge a correspondingly increased capacity, the increased surface being of particular advantage as to the end 28 where the contaminated oil enters the cartridge, there being a tendency in such filters for the end of the cartridge thus exposed to become quickly coated with the separated material thus collected and finally to become clogged thereby so that the oil cannot pass, the utility of the cartridge being thus ended. Increase of the surface therefore effects an important increase of capacity.

The increased surface is however likewise of advantage at the discharge end 29 as it provides a relatively free passage for the oil.

It is also of interest that the cartridge being enclosed in a fabric bag or casing 30 of relatively close mesh the bag or casing has its open end edges at 31 gathered and turned inwardly and preferably inserted in the opening 27' at the top of the cartridge 2 or at either end of the core or otherwise turned inside the bag. The said end edges 31 being thus turned inwardly the escape of the threads or ravelings which might otherwise become detached tending to clog the oil circulating system beyond the filter is prevented. These end edges are preferably bound on the inside of the bag at 31'.

In accordance with the preferred form shown the fabric bag 30 is open at the bottom at 32 being supported around the opening by a draw string or ring at 33 thus further providing for free entrance of the oil into the filter, the cloth bag into which the oil thus enters having important additional filtering effect as the oil passes out at the top through the bag fabric to the outlet pipe 24. The bag 30 being open at the bottom for the entrance of oil, the outside of the bag, the fabric of which is preferably of comparatively close weave, does not collect and become clogged with the heavy sediment separated from the oil and accumulated at the inlet end. This arrangement increases the life of the filter as the bag fabric clogs more quickly than the roller fabric which is of loosely combined soft yarn and would thus tend to prevent the inside of the cartridge from serving its full function as a filter.

In operation the filter is introduced into the oil line of the motor or other stream of oil to be filtered, the tubes or passages 22 and 24 being connected to the oil line and the oil being introduced from the lubricating system of the motor or other source of oil to be treated to the filter at 22 and the filtered oil being discharged at 24 and returned to the system. The oil from the intake tube or passage 22 passes downwardly through the peripherally arranged down passage 34 between the walls of the inner casing 2 and the outer casing 3 passing through the openings or perforations 18 and 20 into the settling basin 4. In this basin or chamber owing to its large capacity in relation to the inlet passage 22 and the down passage 34 the oil is almost without motion so that a considerable portion of the solids and sludge tends to settle and remain in this chamber supplementing the action of the filter cartridge and to this extent protecting it from accumulation of solid and sludge and consequent early clogging.

From the settling chamber or basin 4 the oil passes upwardly through the filter cartridge which it contacts and enters not only through the bottom surface 28 but through the side walls of the bottom axial chamber 27 which are forward of the fabric 25. This chamber considerably increases the surface of the filter which would be normally exposed to the incoming contaminated oil to be filtered and therefore increases the surface over which the material which tends to accumulate on the surface of the filter may be distributed thus increasing the useful life of the filter which is terminated when this surface becomes so coated and clogged that the oil as presented by the oil circulating system of the motor or other source of oil to be treated cannot pass through it.

While the materials separated by filtration accumulate on the cylindrical wall of chamber 27 and on surface 28, there is also an accumulation of such separated materials throughout the fabric composing the cartridge and to this end the roll is preferably formed of loosely fabricated material preferably of soft yarn so that the oil in the process of filtration passes through all the yarns composing the roll or cartridge all of which serve to separate and remove the foreign particles which thus accumulate within and throughout the body of fibrous material 25.

At the top the oil passes outwardly from the top surface 29 of the rolled material which is covered by the filter casing or bag 30 which acts as an additional filtering agent being preferably of fine mesh to give further filtration after the manner of a fine screen or strainer the effect of which is added to the effect of the rolled fabricated material forming the body or cartridge 2. The oil also passes outwardly through the cylindrical walls of the axial chamber 27' at the top facilitating the flow and increasing the capacity of the filter.

The closure of the bag at 31 at the top end or elsewhere in the manner described, the edges being turned inwardly and enclosed within the body is of importance in preventing the escape of threads or ravelings from these end edges into the lubricating system of the motor, these end edges being preferably bound on the inside of the bag at 31'.

It is a further advantage that in the operation of the filter the oil intake passage or tube 22 entering the case, being located at or near the top, the tendency of the oil on the intake side of the filter where the separated material accumulates, to flow back into the crank case of the motor when the motor is stopped carrying the separated material with it, is overcome. The arrangement shown is also desirable in that the outlet passage 24 is located at or near the top so that the filter casing remains full of oil at all times when the motor is idle keeping a supply of clean lubricant ready to move immediately to the parts to be lubricated when the motor is started.

It is also of interset that the bag 30 has a filtering or straining function, and being open at the bottom, i. e. on the intake end of the cartridge at 32, the oil enters at this opening, passes through the rolled fiber 25 and is then strained as it passes through the bag at 35. The opening at the bottom at 32 is particularly helpful in contributing to the free admission of the oil to the fiber 25. The use of a by-pass to prevent stoppage of the lubrication if the filter becomes clogged with accumulation of dirt from failure to change the cartridge being well known, no by-pass is shown. Such by-pass may be provided and located in any suitable manner either within or outside casing.

It is also of interest that the oil used in oil burners for domestic heating and for other purposes contains particles of carbon and other solids of microscopic dimensions which in the operation of the burner particularly in the vaporization of the oil accumulate in the burner forming deposits which as the burner heats become incandescent causing preignition or ignition at improper times, and retarding kindling of the flame at other times, and thus causing failure to ignite, and also causing explosions. The filtration of the oil by means of a cotton filter, it is found, completely removes these deposits practically eliminating all carbon deposits and the harmful consequences thereof, giving much more dependable operation of the burner.

I have thus described a filter cartridge and casing embodying the features of my invention in the preferred form, the description being specific and in detail in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. An oil filter cartridge adapted for use in the filtration of lubricating oil in the circulating systems of internal combustion motors, and in the fuel lines of oil burners and the like, said cartridge comprising a roll of fibrous fabric, a core about which the fabric is rolled, the core being concentric with the axis of the roll and considerably shorter than the axis of the roll providing an axial chamber extending inwardly from the inflow end of said cartridge, the cartridge being adapted to be supported in a filter casing whereby the side walls of said chamber and the adjacent end surface of the cartridge are in operation exposed to the inflowing current of oil for entrance of the same into the filter cartridge.

2. A filter cartridge for oil comprising a core, a roll of fiber formed about the core, the core being shorter than the axis of the roll providing an open axial chamber at one end of the cartridge, said chamber being surrounded by the fiber of the cartridge and having its side walls formed thereof thus increasing the surface of the fiber which may be exposed for the admission of oil to the cartridge.

3. A filter cartridge for use in the filtration of oil in the lubricating system of an internal combustion motor, or in the fuel line of an oil burner, the cartridge comprising a core, a roll of fiber formed about the core, the core being shorter than the axis of the roll providing an axial chamber at each end of the roll.

4. A filter cartridge for use in the filtration of oil, the cartridge comprising a core, a roll of fabric formed about the core, the core being shorter than the axis of the roll providing an axial chamber at an end of the roll, a fabric bag enclosing the filter cartridge said bag having an opening at the end corresponding to said chamber and having free edges surrounding the opening said edges being turned inwardly and gathered and bound on the inside of the bag and inserted in said axial chamber, the bag also having an opening for the admission of the roll.

5. A filter cartridge for use in a filter casing for filtering the oil in the lubricating system of an internal combustion motor or in the fuel line of an oil burner, said cartridge comprising a body of filtering material and a bag of non-reentrant form and of woven fabric enclosing the same, the bag having an opening at one end for the insertion of said body, and an opening at the opposite end of the bag the fabric of the bag having its edges around said latter opening turned inwardly and gathered together and bound on the inside of the bag closing said latter opening and preventing the escape of threads or ravelings from the end edges of the bag into the lubricating system of the motor, or into the burner.

6. A filter cartridge for use in a filter casing for filtering the oil in the lubricating system of an internal combustion motor or in the fuel line of an oil burner or the like, said cartridge comprising a body of filtering material and a bag of non-reentrant form and composed of woven fabric enclosing the same, the bag having an opening, the fabric of the bag having its edges around said opening turned inwardly and gathered together and bound on the inside of the bag closing the opening and preventing the escape of threads or ravelings from the end edges of the bag into the lubricating system of the motor, or into the burner, the fabric bag serving as a filtering agent in addition to said body and having a distended opening spaced from said closed opening for the free admission of oil and tension means for binding the bag material about said latter opening and about said filtering material body.

7. An oil filter for an internal combustion motor or the fuel line of an oil burner comprising a casing having an inlet for oil near the top and an outlet, a sediment basin at the bottom and a filter cartridge above said basin, the casing comprising means for leading the incoming oil downwardly to said basin and presenting it to the bottom of said cartridge to pass upwardly therethrough to said outlet the cartridge comprising a body of filtering material and a bag enclosing the same, the bag having a distended opening disposed towards said basin to admit the oil to said body of filtering material from said basin.

8. The combination with a filter casing having means for supporting a filter cartridge, oil admission and outlet passages and means for leading the oil through the casing and presenting it to one end of said cartridge to pass there through and to said outlet, the cartridge comprising a roll of fabric and a core shorter than the axis of the roll providing a chamber open at said end of the cartridge and surrounded by the filter fabric, giving an increased surface for the entrance of oil into the cartridge.

HARRY B. BECK.